US008484046B1

(12) United States Patent
Bauer et al.

(10) Patent No.: US 8,484,046 B1
(45) Date of Patent: **\*Jul. 9, 2013**

(54) METHOD AND APPARATUS FOR INTERNET ON-LINE INSURANCE POLICY SERVICE

(75) Inventors: Alan R. Bauer, Mill Valley, CA (US); Amanda L. Bowman, Bedford, OH (US); Richard J. Keyser, Euclid, OH (US); Megan N. McNamara, Rocky River, OH (US); Cheryl L. Urminski, Cleveland Heights, OH (US); Leslie Youngstrom, Sacramento, CA (US); Toby Alfred, Orange, OH (US)

(73) Assignee: Progressive Casualty Insurance Company, Mayfield Village, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/969,211

(22) Filed: Dec. 15, 2010

Related U.S. Application Data

(63) Continuation of application No. 11/580,324, filed on Oct. 13, 2006, now Pat. No. 7,877,269, which is a continuation of application No. 09/364,803, filed on Jul. 30, 1999, now Pat. No. 7,124,088.

(51) Int. Cl.
*G06Q 10/00* (2012.01)

(52) U.S. Cl.
USPC .................................. 705/2; 705/4

(58) Field of Classification Search
USPC ............................................ 705/2
See application file for complete search history.

(56) References Cited

U.S. PATENT DOCUMENTS

| 4,567,359 | A |   | 1/1986 | Lockwood |
| 4,831,526 | A | * | 5/1989 | Luchs et al. ............ 705/4 |
| 4,839,804 | A |   | 6/1989 | Roberts et al. |
| 5,191,522 | A |   | 3/1993 | Bosco et al. |
| 5,202,827 | A |   | 4/1993 | Sober |
| 5,225,976 | A |   | 7/1993 | Tawil |
| 5,446,653 | A |   | 8/1995 | Miller et al. |

(Continued)

FOREIGN PATENT DOCUMENTS

| EP | 0 895 173 A2 | 2/1999 |
| EP | 1 115 075 A2 | 7/2001 |

(Continued)

OTHER PUBLICATIONS

"CIGNA P&C Introduces ComputerGuard™ Insurance: Fills the Coverage Gaps Left by Many Homeowners Policies," PR Newswire, Apr. 14, 1999, 3 pages.

(Continued)

*Primary Examiner* — Hiep V Nguyen
(74) *Attorney, Agent, or Firm* — Brinks Hofer Gilson & Lione (57) ABSTRACT

An Internet on-line insurance policy service system that facilitates real-time automated communication of policy information, adjustment of policy parameters, calculation and communication of resulting policy quotes, and implementation of policy changes, while obviating insurer personnel involvement and supervision of the communication. The system comprises a plurality of software modules relating to on-line real-time communication of existing policy information, testing of a wide range of variations in policy parameters, computing and communicating changes in policy premiums that would result from such variations, communicating desired changes in policy parameters and implementing desired policy changes. Other modules relate to communication of claims information and the providing of on-line forms.

30 Claims, 6 Drawing Sheets

U.S. PATENT DOCUMENTS

| | | | |
|---|---|---|---|
| 5,523,942 | A | 6/1996 | Tyler et al. |
| 5,537,315 | A | 7/1996 | Mitcham |
| 5,644,727 | A | 7/1997 | Atkins |
| 5,655,085 | A | 8/1997 | Ryan et al. |
| 5,699,528 | A * | 12/1997 | Hogan ................................ 705/40 |
| 5,706,442 | A | 1/1998 | Anderson et al. |
| 5,710,887 | A | 1/1998 | Chelliah et al. |
| 5,797,134 | A | 8/1998 | McMillan et al. |
| 5,809,478 | A | 9/1998 | Greco et al. |
| 5,845,256 | A | 12/1998 | Pescitelli et al. |
| 5,852,811 | A | 12/1998 | Atkins |
| 5,870,719 | A | 2/1999 | Maritzen et al. |
| 5,884,274 | A | 3/1999 | Walker et al. |
| 5,903,873 | A | 5/1999 | Peterson et al. |
| 5,903,881 | A | 5/1999 | Schrader et al. |
| 5,920,848 | A | 7/1999 | Schutzer et al. |
| 5,930,759 | A | 7/1999 | Moore et al. |
| 5,933,816 | A | 8/1999 | Zeanah et al. |
| 5,950,169 | A | 9/1999 | Borghesi et al. |
| 5,956,691 | A | 9/1999 | Powers |
| 5,963,926 | A | 10/1999 | Kumomura |
| 5,974,146 | A | 10/1999 | Randle et al. |
| 6,003,019 | A | 12/1999 | Eaton et al. |
| 6,115,690 | A | 9/2000 | Wong |
| 6,115,737 | A | 9/2000 | Ely et al. |
| 6,161,128 | A | 12/2000 | Smyk |
| 6,254,482 | B1 | 7/2001 | Walker et al. |
| 6,341,265 | B1 | 1/2002 | Provost et al. |
| 6,343,271 | B1 | 1/2002 | Peterson et al. |
| 6,347,302 | B1 | 2/2002 | Joao |
| 6,526,386 | B1 | 2/2003 | Chapman et al. |
| 6,535,855 | B1 | 3/2003 | Cahill et al. |
| 6,587,867 | B1 | 7/2003 | Miller et al. |
| 6,760,414 | B1 | 7/2004 | Schurko et al. |
| 6,869,362 | B2 | 3/2005 | Walker et al. |
| 6,898,574 | B1 | 5/2005 | Regan |
| 7,069,228 | B1 | 6/2006 | Rose et al. |
| 7,076,504 | B1 | 7/2006 | Handel et al. |
| 7,089,202 | B1 | 8/2006 | McNamar et al. |
| 7,319,970 | B1 | 1/2008 | Simone |
| 7,624,031 | B2 | 11/2009 | Simpson et al. |
| 7,640,176 | B1 | 12/2009 | Aldrich et al. |
| 7,707,049 | B2 | 4/2010 | Van Cleave et al. |
| 2002/0026334 | A1 | 2/2002 | Igoe |
| 2002/0046063 | A1 | 4/2002 | Fujio |
| 2006/0271414 | A1 | 11/2006 | Fenton et al. |

FOREIGN PATENT DOCUMENTS

| | | |
|---|---|---|
| EP | 1 168 224 A1 | 1/2002 |
| EP | 1 275 059 | 1/2003 |
| EP | 1 303 117 A1 | 4/2003 |
| GB | 2 310 944 A | 9/1997 |
| GB | 2 382 187 A | 5/2003 |
| JP | 10-293794 | 11/1998 |
| JP | 2001-229300 | 8/2001 |
| JP | 2002-49760 | 2/2002 |
| WO | WO 98/21680 A1 | 5/1998 |
| WO | WO 98/24040 A1 | 6/1998 |
| WO | WO 98/53582 A1 | 11/1998 |
| WO | WO 99/01810 A2 | 1/1999 |
| WO | WO 99/07102 A1 | 2/1999 |
| WO | WO 00/52623 A2 | 8/2000 |
| WO | WO 00/72220 A1 | 11/2000 |
| WO | WO 01/16845 A1 | 3/2001 |
| WO | WO 01/52136 A1 | 7/2001 |
| WO | WO 01/98996 A1 | 12/2001 |
| WO | WO 02/17032 A2 | 2/2002 |
| WO | WO 02/19242 A1 | 3/2002 |
| WO | WO 02/21371 A1 | 3/2002 |
| WO | WO 02/25559 A2 | 3/2002 |
| WO | WO 02/37374 A1 | 5/2002 |
| WO | WO 02/37387 A2 | 5/2002 |
| WO | WO 02/41213 A1 | 5/2002 |
| WO | WO 02/073360 A2 | 9/2002 |
| WO | WO 03/058383 A2 | 7/2003 |
| WO | WO 03/058530 A2 | 7/2003 |
| WO | WO 2004/049114 A2 | 6/2004 |
| WO | WO 2004/075024 A2 | 9/2004 |
| WO | WO 2004/077937 A2 | 9/2004 |
| WO | WO 2004/084005 A2 | 9/2004 |
| WO | WO 2004/088465 A2 | 10/2004 |
| WO | WO 2004/088466 A2 | 10/2004 |
| WO | WO 2004/111787 A2 | 12/2004 |
| WO | WO 2005/013095 A2 | 2/2005 |
| WO | WO 2005/033881 A2 | 4/2005 |
| WO | WO 2005/065299 A2 | 7/2005 |
| WO | WO 2006/053087 A2 | 5/2006 |
| WO | WO 2006/060725 A2 | 6/2006 |
| WO | WO 2007/014224 A2 | 2/2007 |

OTHER PUBLICATIONS

Amazon.com Timeline, 2012, available from the internet at <http://phx.corporate-ir.net/External.File?item=UGFyZW5OSUQ9MTQ2MzQ4fENoaWxksUQ9LTF8VHIwZT0z&t=1>, last visited Sep. 27, 2012, 27 pages.

Anthes, G., "Cobol Coders: Going, Going, Gone?," Computerworld, Oct. 9, 2006, printed from the internet at <http://www.computerworld.com/s/article/print/266228/Cobol_Coders_Going_Going_Gone . . . > on Sep. 26, 2012, 4 pages.

Creasy, R. J., "The Origin of the VM/370 Time-Sharing System," IBM J. Res. Develop., vol. 25, No. 5, Sep. 1981, 8 pages.

Gainer, R., "Allocating the Risk of Loss for Bank Card Fraud on the Internet," 15 J. Marshall J. Computer & Info L. 39, 1996-1997, pp. 39-50.

Personal Auto Manual North Carolina, Insurance Services Office, copyright 1980, 76 pages.

Selby, D. W. et al., "The Effects of Physicians' Computer Applications on Health Insurance Claims and Reimbursements," IEEE, 1979, pp. 746-751.

U.S. Appl. No. 09/329,659, filed Jun. 10, 1000, 69 pages.

Yates, J., "From Tabulators to Early Computers in the U.S. Life Insurance Industry: Co-evolution and Continuities," Sloan School Working Paper #3618-93, Center for Coordination Science Working Paper #153, Presented at the Society for the History of Technology, Oct. 1993, 44 pages.

Declaration of David Klausner, Covered Business Method Review Petition of United States Patent No. 7,124,088, LMIC-019-802, Sep. 28, 2012, 15 pages.

Declaration of Mary L. O'Neil, Covered Business Method Review Petition of United States Patent No. 7,124,088, LMIC-019-802, Sep. 28, 2012, 18 pages.

Declaration of David Klausner, Covered Business Method Review Petition of United States Patent No. 7,124,088, LMIC-019-801, Sep. 28, 2012, 19 pages.

Declaration of Mary L. O'Neil, Covered Business Method Review Petition of United States Patent No. 7,124,088, LMIC-019-801, Sep. 28, 2012, 16 pages.

Declaration of David Klausner, Covered Business Method Review Petition of United States Patent No. 7,877,269, LMIC-020-801, Sep. 28, 2012, 20 pages.

Declaration of Mary L. O'Neil, Covered Business Method Review Petition of United States Patent No. 7,877,269, LMIC-020-801, Sep. 2, 2012, 16 pages.

Declaration of David Klausner, Covered Business Method Review Petition of United States Patent No. 7,877,269, LMIC-020-802, Sep. 28, 2012, 15 pages.

Declaration of Mary L. O'Neil, Covered Business Method Review Petition of United States Patent No. 7,877,269, LMIC-020-802, Sep. 2, 2012, 18 pages.

"The Marketing of Insurance over the Internet," National Association of Insurance Commissioners, copyright 1998, 65 pages.

The Marketing of Insurance over the Internet, National Association of Insurance Commissioners, copyright 1998, 65 pages.

Petition for Covered Business Method Patent Review of U.S. Patent No. 7,124,088 under 35 U.S.C. § 321, 37 C.F.R. § 42.304, filed Sep. 28, 2012, in the United States Patent and Trademark Office, Case CBM2012-00010, *Liberty Mutual Insurance Co.* versus *Progressive Casualty Insurance Co.*, 84 pages.

Patent Owner's Preliminary Response Pursuant to 37 C.F.R. § 42.207, U.S. Patent No. 7,124,088, filed Jan. 2, 2013, in the United States Patent and Trademark Office, Case CBM2012-00010, *Liberty Mutual Insurance Co.* versus *Progressive Casualty Insurance Co.*, 66 pages.
Decision, Institution of Covered Business Method Review 37 C.F.R. § 42.208, U.S. Patent No. 7,124,088, dated Feb. 25, 2013, United States Patent and Trademark Office, Case CBM2012-00010, *Liberty Mutual Insurance Co.* versus *Progressive Casualty Insurance Co.*, 34 pages.
Petition for Covered Business Method Patent Review of U.S. Patent No. 7,124,088 under 35 U.S.C. § 321, 37 C.F.R. § 42.304, filed Sep. 28, 2012, in the United States Patent and Trademark Office, Case CBM2012-00011, *Liberty Mutual Insurance Co.* versus *Progressive Casualty Insurance Co.*, 83 pages.
Patent Owner's Preliminary Response Pursuant to 37 C.F.R. § 42.207, U.S. Patent No. 7,124,088, filed Jan. 2, 2013, in the United States Patent and Trademark Office, Case CBM2012-00011, *Liberty Mutual Insurance Co.* versus *Progressive Casualty Insurance Co.*, 51 pages.
Decision, Institution of Covered Business Method Review 37 C.F.R. § 42.208, U.S. Patent No. 7,124,088, dated Feb. 25, 2013, United States Patent and Trademark Office, Case CBM2012-00011, *Liberty Mutual Insurance Co.* versus *Progressive Casualty Insurance Co.*, 35 pages.
Petition for Covered Business Method Patent Review of U.S. Patent No. 7,877,269 under 35 U.S.C. § 321, 37 C.F.R. § 42.304, filed Oct. 2, 2012, in the United States Patent and Trademark Office, Case CBM2013-00001, *Liberty Mutual Insurance Co.* versus *Progressive Casualty Insurance Co.*, 85 pages.
Patent Owner's Preliminary Response Pursuant to 37 C.F.R. § 42.207, U.S. Patent No. 7,877,269, filed Jan. 4, 2013, in the United States Patent and Trademark Office, Case CBM2013-00001, *Liberty Mutual Insurance Co.* versus *Progressive Casualty Insurance Co.*, 52 pages.
Decision, Institution of Covered Business Method Review 37 C.F.R. § 42.208, U.S. Patent No. 7,877,269, dated Feb. 27, 2013, United States Patent and Trademark Office, Case CBM2013-00001, *Liberty Mutual Insurance Co.* versus *Progressive Casualty Insurance Co.*, 50 pages.
Petition for Covered Business Method Patent Review of U.S. Patent No. 7,877,269 under 35 U.S.C. § 321, 37 C.F.R. § 42.304, filed Oct. 2, 2012, in the United States Patent and Trademark Office, Case CBM2013-00002, *Liberty Mutual Insurance Co.* versus *Progressive Casualty Insurance Co.*, 85 pages.
Patent Owner's Preliminary Response Pursuant to 37 C.F.R. § 42.207, U.S. Patent No. 7,877,269, filed Jan. 4, 2013, in the United States Patent and Trademark Office, Case CBM2013-00002, *Liberty Mutual Insurance Co.* versus *Progressive Casualty Insurance Co.*, 69 pages.
Decision, Institution of Covered Business Method Review 37 C.F.R. § 42.208, U.S. Patent No. 7,877,269, dated Feb. 27, 2013, United States Patent and Trademark Office, Case CBM2013-00002, *Liberty Mutual Insurance Co.* versus *Progressive Casualty Insurance Co.*, 49 pages.
"CSR-Online Supports Web-Based Insurance Claims," Business Wire, Jan. 12, 1999, 2 pages.
"How an Internet Link Cures Benefits Administration Ills.," Insurance Network News, Mar. 7, 1997, 2 pages.
"New Software Enables 24-hour Online Claims," National Underwriter, 103, 10, Mar. 8, 1999, pp. 9.
"On-Line Benefits Begin to Pick Up Steam," Insurance Networking News, Sep. 21, 1997, 3 pages.
"Partnership Hopes to Help Insurers on Web," Insurance & Technology, Mar. 1999, pp. 9.
"Point-and-Click, Interactive Mortgage Insurance," RMIC Direct web page, 1998, printed from the internet at <http://web.archive.org/web/19980125170752/http://www.rmic.com/cmicd . . . >, 2 pages.
"Prudential HealthCare: A test bed for Internet Security," InfoWorld, vol. 19, No. 23, Jun. 9, 1997, pp. 65.
"Prudential Reaches Out: An Interactive Site Gives Customers the Access They've Asked For," Nov. 1997, CIO magazine, 1 page.
"RMIC Expands Internet Insurance Lending," Mortgage Marketplace vol. 21, No. 12, 1998, 1 page.

"RMIC Expands Servicing Capabilities Via New Internet Version of RMICDIRECT," Business Wire, 1998, 2 pages.
"State of the Practice: Intranets are busting out all over. For example . . . ," Jupitermedia Corporation, copyright 2002, printed from the internet at <http://www.intranetjournal.com/idm/vol2/11/readers-web.html>, on Jul. 11, 2011, 4 pages.
"U.K. Insurer Introduces Internet Claims Filing Service," Insurance Networking and Data Management, Jun. 30, 1998, 2 pages.
"Xcellent Ships RemoteWare 3.1, Enhanced Remote Access Software for the Enterprise; New features provide increased management, optimization and control to site administrators and users in a remote and mobile environment," PR Newswire, Oct. 7, 1996, 3 pages.
AAA Direct—Insurance Web Page, "Policy Changes", AAA Michigan, 1999, printed from the internet at <http://web.archive.org/web/19990220172857/http://www.aadirect.com/ . . . >, Auto Club Life Insurance Company, copyright 1999, 10 pages.
Admiral Web Page, "Making Changes to Your Policy," 1999, printed from the internet at <http://web.archive.org/web/19981205140039/http://www.admiral.uk.com . . . >, 4 pages.
Ashley, Charles C., "Graphical User Interface Is Ready to Replace DOS.," Best's Review, Property-Casualty Insurance Edition, vol. 94, No. 9, Jan. 1994, printed from the internet at <http://proxy.montgomerylibrary.org:2062/ehost/delivery?sid=c14570ad-1e43-4734-aca6-e . . . > on Jan. 24, 2013, 4 pages.
Banking and Finance on the Internet, Ed. Mary J. Cronin, John Wiley & Sons, Inc., New York: New York, copyright 1998, 19 pages.
Bodendorf, Freimut et al., "Enhancing e-CRM in the Insurance Industry by Mobile e-Services," Proceedings of the 2005 IEEE International Conference on e-Technology, e-Commerce, and e-Service, pp. 235-239 (5 pages).
Browning, Ed R., "New Technology and Policy Change Upload," APT Rough Notes, Strategic Insurance Software, Inc., Sep. 1997, pp. A20-A21 (3 pages).
Conley, Michael E., "Just What Are 'Internet-Supported' Products?," National Underwriter, 100, 46, Nov. 11, 1996, p. 20.
Creasy, R. J., "The Origin of the VM/370 Time-Sharing System," IBM J. Res. Develop., vol. 25, No. 5, Sep. 1961, pp. 483-490.
Drape, Dana L., "Legal Implications of Marketing Insurance Over the Internet," The Brief, Spring 1998, pp. 24-35.
E*TRADE America's Electronic Brokerage web page, "Open an Account," Jul. 5, 1998, printed from the internet at <http://web.archive.org/web/19980705102652/http://www.etrade.com/cgi-bin/forms.cgi?cobrand=> on Sep. 27, 2012, 3 pages.
E*Trade Home p., Apr. 9, 1997-Jul. 28, 2011, printed from the internet at <http://web.archive.org/web/19970713050332/http://www.etrade.com/>, on Sep. 27, 2012, 10 pages. Publication Date.
Farmer, Bennie L., "Automated Consumer to Business Electronic Marketplace System," Provisional Patent Application, filed Apr. 16, 2003 in the United States Patent and Trademark Office, 48 pages.
Fenton, David A. et al., "System and Method for Processing an Insurance Application during a Single User Session," U.S. Appl. No. 09/329,659, Non-Provisional Patent Application Papers filed with the United States Patent and Trademark Office on Jun. 10, 1999, 69 pages.
Fitzgerald, Kate, "Open Access," Insurance Networking and Data Management, Jan. 31, 1998, 7 pages.
Joao, Raymond A., "Apparatus and Method for Providing Employee Benefits and/or Employee Benefits Information," U.S. Appl. No. 60/100,651, Provisional Application Papers filed with the United States Patent and Trademark Office on Sep. 16, 1998, 116 pages.
Jonker, Catholijn M. et al, "A Multi-agent Architecture for an Intelligent Website in Insurance," M. Klusch, O.M. Shehory,and G. Weiss Eds., Cooperative Information Agents III, Third International Workshop, CIA '99, LNAI 1652, 1999 pp. 86-100.
Kimbark, Bill, "Time-Saving Benefits Software—Software Review—Evaluation," HR Magazine, Dec. 1997, printed from the internet at <http://findarticles.com/p/articles/mi_m3495/is_n12_v42/ai_20204647/?t . . . >, 3 pages.
Koco, Linda, "NAIP Eyes Possible Equity Indexed Product Designation," National Underwriter, 103, 20, May 17, 1999, p. 13-14.
Krishnan, Mayuram S. et al., "Customer Satisfaction for Financial Services: The Role of Products, Services, and Information Technology," Michigan Ross School of Business, Ross School of Business Working Paper Series, Working Paper No. 99-004, Jun. 1998, 42 pages.

Liberty Mutual—Auto, Home and Life Insurance—Customer Service web page, Liberty Mutual Insurance Company, 1999, printed from the internet at <http://web.archive.org/web/19990508054552/http://www.libertymutual.c . . . > on Sep. 19, 2012, 1 page.

Marlin, Steven, Atlantic Mutual Leads Comm. P&C Charge, Insurance & Technology, 23, 3, Mar. 1998, p. 44.

McNamar, Richard T. et al., "Method and System for Internet Banking and Financial Services," U.S. Appl. No. 60/136,400, Provisional Application Papers filed with the United States Patent and Trademark Office on May 27, 1999, 73 pages.

Nordhaus, George, "Sick of the Internet? Everywhere you look, it's Internet, Internet, Internet," APT Rough Notes, Sep. 1997, p. 48 (3 pages).

Ouimette, Gates, "The One-to-One Advantage," Best's Review, Life-Health Insurance Edition, Sep. 1998, vol. 98, No. 5, p. 93, printed from the internet at <http://proxy.montgomerylibrary.org:2062/ehost/delivery?sid=c14570ad-1e43-4734-aca6-e . . . > on Jan. 24, 2013, 4 pages.

Paelan, Joseph P., "Motor Vehicle Operating Data Gathering Methodology and Analysis for Eventual use with Underwriter Statistic Metrics," Provisional Patent Application, filed May 2, 2003 in the United States Patent and Trademark Office, 5 pages.

Peters, Gerald H., "Insurers Still Climbing Internet Learning Curve," Best's Review, vol. 97, No. 6, Oct. 1996, pp. 112.

PR Newswire Association, Inc., Certificate of Authenticity for Jett A. King regarding, "CIGNA P&C Introduces ComputerGuard™ Insurance; Files the Coverage Gaps Left by Many Homeowners Policies," PR Newswire, Apr. 14, 1999, 3 pages.

PR Newswire, Certificate of Authenticity for Chari Walsh regarding, "XcelleNet Ships Remote Ware 3.1, Enhanced Remote Access Software for the Enterprise: New Features Provide Increased Management, Optimization and Control to Site Administrators and Users in a Remote and Mobile Environment," PR Newswire, Oct. 7, 1996, 4 pages.

Presidential Savings Bank, "News from Presidential" web page, copyright 1997, printed from the internet at <http://web.archive.org/web/19971212024908/http://www.presidential.com/news.htm> on Sep. 27, 2012, 2 pages.

Quality Progress, "Insurance Industry Finds Internet Useful Customer-Service Tool," Mar. 1999, pp. 25.

Rabkin, Barry, "Winners Will Deliver Real-Time Customer Service," National Underwriter, vol. 98, No. 40, Oct. 3, 1994, pp. 51 (4 pages).

Selby, Dayton W. et al., "The Effects of Physicians' Computer Applications on Health Insurance Claims and Reimbursements," IEEE, 1979, pp. 746-751.

Shapiro, Michael, "Customer Connections—Direct-response marketing gets offers into customers' hands; the Internet is a 24-hour information source. Used together, they can provide insurers with an effective sales strategy," Best's Review, Aug. 1999, pp. 77-79.

Sirbu, Marvin et al., "NetBill: An Internet Commerce System Optimized for Network-Delivered Services," IEEE Personal Communications, vol. 2, No. 4, Aug. 1995, pp. 34-39.

Stern, Larry N. et al., "Life Online—To Increase individual life insurance sales on the Internet, a company must overcome market-entry barriers, generate greater consumer awareness and improve opportunities for cross selling," Best's Review, May 2001, pp. 119-121.

Strazewski, Len, "Pioneers on the Web Frontier: Whether They Use It for Marketing, Advertising, or Customer Service, Agents are Innovative in Their Use of the Internet," APT Rough Notes, May 1996, pp. 38, 40, 56, and 57.

Teubner, Rolf A. et al., "Planning and Designing Web-Based Electronic Commerce: A Case Study in the Insurance Industry," Special Edition—Electronic Commerce, Australian Journal of Information Systems, vol. 6, No. 1, Nov. 1998, pp. 86-96.

Ticehurst, Darrell et al., "Establishing a Home Page," Best's Review, vol. 97, No. 6, Oct. 1996, pp. 116-117.

Way, Paul, "Conseco Brings Annuity Product to the Web," Insurance and Technology, vol. 23, No. 2, Feb. 1998, pp. 14.

Whitney, Sally, "Taking it on the Road: Insurance Agents and Adjusters Are Packing Up Their Computers and Doing More Business on the Go," Best's Review, Jul. 1999, pp. 45-48, 50, and 52.

Woolsey, Christine, "The End of the Paper Trail," Insurance Networking and Data Management, Jun. 30, 1998, 7 pages.

Yates, JoAnne, "From Tabulators to Early Computers in the U.S. Life Insurance Industry: Co-evolution and Continuities," Sloan School Working Paper No. 3618-93, Center for Coordination Science Working Paper No. 153, Presented at the Society for the History of Technology, Oct. 1993, 44 pages.

State Farm's Initial, and Liberty Mutual Defendants' Supplemental, Local Patent Rule 3.5 and 3.6 Initial Invalidity and Unenforceability Contentions and Document Production—U.S. Patent Nos. 7,124,088 and 7,877,269, Case Nos. 1:12-cv-01068-BYP and 1:11-cv-00082-Byp, filed Jan. 25, 2013, 76 pages.

Exhibits A1-A13 of State Farm's Initial, and Liberty Mutual Defendants' Supplemental, Local Patent Rule 3.5 and 3.6 Initial Invalidity and Unenforceability Contentions and Document Production—U.S. Patent Nos. 7,124,088 and 7,877,269, Case Nos. 1:12-cv-01068-BYP and 1:11-cv-00082-BYP, filed Jan. 25, 2013, 546 pages.

Exhibits B1-B13 of State Farm's Initial, and Liberty Mutual Defendants' Supplemental, Local Patent Rule 3.5 and 3.6 Initial Invalidity and Unenforceability Contentions and Document Production—U.S. Patent Nos. 7,124,088 and 7,877,269, Case Nos. 1:12-cv-01068-BYP and 1:11-cv-00082-BYP, filed Jan. 25, 2013, 1299 pages.

Exhibits C1-C10 of State Farm's Initial, and Liberty Mutual Defendants' Supplemental, Local Patent Rule 3.5 and 3.6 Initial Invalidity and Unenforceability Contentions and Document Production—U.S. Patent Nos. 7,124,088 and 7,877,269, Case Nos. 1:12-cv-01068-BYP and 1:11-cv-00082-BYP, filed Jan. 25, 2013, 610 pages.

Exhibits D11-D12 of State Farm's Initial, and Liberty Mutual Defendants' Supplemental, Local Patent Rule 3.5 and 3.6 Initial Invalidity and Unenforceability Contentions and Document Production—U.S. Patent Nos. 7,124,088 and 7,877,269, Case Nos. 1:12-cv-01068-BYP and 1:11-cv-00082-BYP, filed Jan. 25, 2013, 1530 pages.

Exhibit E of State Farm's Initial, and Liberty Mutual Defendants' Supplemental, Local Patent Rule 3.5 and 3.6 Initial Invalidity and Unenforceability Contentions and Document Production—U.S. Patent Nos. 7,124,088 and 7,877,269, Case Nos. 1:12-cv-01068-BYP and 1:11-cv-00082-BYP, filed Jan. 25, 2013, 615 pages.

Exhibit F of State Farm's Initial, and Liberty Mutual Defendants' Supplemental, Local Patent Rule 3.5 and 3.6 Initial Invalidity and Unenforceability Contentions and Document Production—U.S. Patent Nos. 7,124,088 and 7,877,269, Case Nos. 1:12-cv-01068-BYP and 1:11-cv-00082-BYP, filed Jan. 25, 2013, 1818 pages.

Exhibit G of State Farm's Initial, and Liberty Mutual Defendants' Supplemental, Local Patent Rule 3.5 and 3.6 Initial Invalidity and Unenforceability Contentions and Document Production—U.S. Patent Nos. 7,124,088 and 7,877,269, Case Nos. 1:12-cv-01068-BYP and 1:11-cv-00082-BYP, filed Jan. 25, 2013, 31 pages.

Exhibit H of State Farm's Initial, and Liberty Mutual Defendants' Supplemental, Local Patent Rule 3.5 and 3.6 Initial Invalidity and Unenforceability Contentions and Document Production—U.S. Patent Nos. 7,124,088 and 7,877,269, Case Nos. 1:12-cv-01068-BYP and 1:11-cv-00082-BYP, filed Jan. 25, 2013, 41 pages.

Case No. 1:11-cv-00082-BYP, Complaint, *Progressive Casualty Insurance Company* versus *Allstate Insurance Company et al.*, U.S. District Court, Northern District of Ohio (Cleveland), filed Jan. 12, 2011, 63 pages.

Case No. 1:11-cv-00082-BYP, Original Summons and Magistrate Consent Form Issued for Service Upon Allstate Insurance Company et al., *Progressive Casualty Insurance Company* versus *Allstate Insurance Company et al.*, U.S. District Court, Northern District of Ohio (Cleveland), filed Jan. 13, 2011, 14 pages, Case No. 1:11-cv-00082-BYP, Safeco and Liberty Mutual Defendant's Motion to Extend Time to File Responsive Pleadings with Consent of Plaintiff, *Progressive Casualty Insurance Company* versus *Allstate Insurance Company et al.*, U.S. District Court, Northern District of Ohio (Cleveland), filed Jan. 25, 2011, 5 pages.

Case No. 1:11-cv-00082-BYP, Progressive Amended Complaint, *Progressive Casualty Insurance Company* versus *Allstate Insurance Company et al.*, U.S. District Court, Northern District of Ohio (Cleveland), filed Jan. 27, 2011, 68 pages.

Case No. 1:11-cv-00082-BYP, Allstate Insurance Company et al. Answer, Affirmative Defenses, and Counterclaims to Amended Complaint, *Progressive Casualty Insurance Company* versus *Allstate Insurance Company et al.*, U.S. District Court, Northern District of Ohio (Cleveland), filed Jan. 28, 2011, 37 pages.

Case No. 1:11-cv-00082-BYP, Allstate Insurance Company et al. Motion to Sever, Consolidate and Stay All Claims, Defenses and Counterclaims Relating to U.S. Patent No. 6,064,970, *Progressive Casualty Insurance Company* versus *Allstate Insurance Company et al.*, U.S. District Court, Northern District of Ohio (Cleveland), filed Feb. 9, 2011, 69 pages.

Case No. 1:11-cv-00082-BYP, Safeco Insurance Company of Illinois et al. Motion to Sever, *Progressive Casualty Insurance Company* versus *Allstate Insurance Company et al.*, U.S. District Court, Northern District of Ohio (Cleveland), filed Feb. 9, 2011, 20 pages.

Case No. 1:11-cv-00082-BYP, Progressive Casualty Insurance Company's Answer to the Allstate Defendants' Counterclaims, *Progressive Casualty Insurance Company* versus *Allstate Insurance Company et al.*, U.S. District Court, Northern District of Ohio (Cleveland), filed Feb. 18, 2011, 9 pages.

Case No. 1:11-cv-00082-BYP, Liberty Mutual's Memorandum in Partial Opposition to Allstate's Motion to Sever, Consolidate, and Stay All Claims, Defenses and Counterclaims Relating to U.S. Patent No. 6,064,970, *Progressive Casualty Insurance Company* versus *Allstate Insurance Company et al.*, U.S. District Court, Northern District of Ohio (Cleveland), filed Feb. 23, 2011, 24 pages.

Case No, 1:11-cv-00082-BYP, Progressive's Response to Allstate's Motion to Sever, Consolidate and Stay All Claims, Defenses and Counterclaims Relating to U.S. Patent No. 6,064,970, *Progressive Casualty Insurance Company* versus *Allstate Insurance Company et al.*, U.S. District Court, Northern District of Ohio (Cleveland), filed Feb. 28, 2011, 5 pages.

Case No. 1:11-cv-00082-BYP, Progressive Casualty Insurance Company's Memorandum in Opposition to the Liberty Mutual Defendants' Motion to Sever, *Progressive Casualty Insurance Company* versus *Allstate Insurance Company et al.*, U.S. District Court, Northern District of Ohio (Cleveland), filed Feb. 28, 2011, 15 pages.

Case No. 1:11-cv-00082-BYP, Order Granting Allstate Defendants' Motion to Appear Pro Hac Vice, *Progressive Casualty Insurance Company* versus *Allstate Insurance Company et al.*, U.S. District Court, Northern District of Ohio (Cleveland), dated Mar. 3, 2011, 1 page.

Case No. 1:11-cv-00082-BYP, Allstate's Reply in Support of Its Motion to Sever, Consolidate and Stay All Claims, Defenses and Counterclaims Relating to U.S. Patent No. 6,064,970, *Progressive Casualty Insurance Company* versus *Allstate Insurance Company et al.*, U.S. District Court, Northern District of Ohio (Cleveland), filed Mar. 9, 2011, 9 pages.

Case No. 1:11-cv-00082-BYP, Safeco Insurance Company of Illinois et al. Reply in Support of Motion to Sever, *Progressive Casualty Insurance Company* versus *Allstate Insurance Company et al.*, U.S. District Court, Northern District of Ohio (Cleveland), filed Mar. 10, 2011, 9 pages.

Case No. 1:11-cv-00082-BYP, Liberty Mutual Defendants' Answer and Counterclaims to Plaintiff's Amended Complaint, *Progressive Casualty Insurance Company* versus *Allstate Insurance Company et al.*, U.S. District Court, Northern District of Ohio (Cleveland), filed Mar. 14, 2011, 30 pages.

Case No. 1:11-cv-00082-BYP, Drive Trademark Holdings, LP's Answer to Counterclaim, *Progressive Casualty Insurance Company* versus *Allstate Insurance Company et al.*, U.S. District Court, Northern District of Ohio (Cleveland), filed Mar. 17, 2011, 6 pages.

Case No. 1:11-cv-00082-BYP, Defendants Allstate Insurance Company et al. Notice of Service of Initial Disclosures, *Progressive Casualty Insurance Company* versus *Allstate Insurance Company et al.*, U.S. District Court, Northern District of Ohio (Cleveland), filed Mar. 25, 2011, 3 pages.

Case No. 1:11-cv-00082-BYP, Liberty Mutual Defendants' Motion to Stay Litigation Pending Ex Parte Reexamination of the Patents-In-Suit by the United States PTO, *Progressive Casualty Insurance Company* versus *Allstate Insurance Company et al.*, U.S. District Court, Northern District of Ohio (Cleveland), filed Apr. 4, 2011, 218 pages.

Case No. 1:11-cv-00082-BYP, Progressive Casualty Insurance Company's Answer to Liberty Mutual's Counterclaims, *Progressive Casualty Insurance Company* versus *Allstate Insurance Company et al.*, U.S. District Court, Northern District of Ohio (Cleveland), filed Apr. 4, 2011, 5 pages.

Case No. 1:11-cv-00082-BYP, Notice of New Legal Authority Relevant to Liberty Mutual Defendants' Motion to Sever, *Progressive Casualty Insurance Company* versus *Allstate Insurance Company et al.*, U.S. District Court, Northern District of Ohio (Cleveland), filed Apr. 13, 2011, 6 pages.

Case No. 1:11-cv-00082-BYP, Liberty Mutual Defendants' Motion for Extension of Time in Which to Serve Responses to Progressive's First Sets of Interrogatories and Requests for Production, *Progressive Casualty Insurance Company* versus *Allstate Insurance Company et al.*, U.S. District Court, Northern District of Ohio (Cleveland), filed Apr. 14, 2011, 57 pages.

Case No. 1:11-cv-00082-BYP, Joint Motion for Entry of Stipulated Protective Order, *Progressive Casualty Insurance Company* versus *Allstate Insurance Company et al.*, U.S. District Court, Northern District of Ohio (Cleveland), filed Apr. 15, 2011, 19 pages.

Case No. 1:11-cv-00082-BYP, Memorandum of Opinion and Order (1) Granting, in Part, Allstate's Motion to Sever, Consolidate and Stay All Claims, Defenses and Counterclaims Relating to U.S. Patent No. 6,064,970, *Progressive Casualty Insurance Company* versus *Allstate Insurance Company et al.*, U.S. District Court, Northern District of Ohio (Cleveland), dated Apr. 28, 2011, 7 pages.

Case No. 1:11-cv-00082-BYP, Liberty Mutual Defendants' Renewed Motion to Stay the Patent Infringement Claims Against Them Pending Ex Parte Reexamination of the Patents-In-Suit by the United States Patent and Trademark Office, *Progressive Casualty Insurance Company* versus *Allstate Insurance Company et al.*, U.S. District Court, Northern District of Ohio (Cleveland), filed Jun. 14, 2011, 189 pages.

Case No. 1:11-cv-00082-BYP, Progressive Casualty Insurance Company's Opposition to Liberty Mutual Defendants' Renewed Motion to Stay the Patent Infringement Claims Against Them Pending Ex Parte Reexamination of the Patents-In-Suit by the United States Patent and Trademark Office, *Progressive Casualty Insurance Company* versus *Allstate Insurance Company et al.*, U.S. District Court, Northern District of Ohio (Cleveland), filed Jun. 28, 2011, 36 pages.

Case No. 1:11-cv-00082-BYP, Allstate's Response to Liberty Mutual Defendants' Renewed Motion to Stay the Patent Infringement Claims Against Them Pending Ex Parte Reexamination of the ['269 and '088 Patents] by the United States Patent and Trademark Office, *Progressive Casualty Insurance Company* versus *Allstate Insurance Company et al.*, U.S. District Court, Northern District of Ohio (Cleveland), filed Jun. 29, 2011, 4 pages.

Case No. 1:11-cv-00082-BYP, Liberty Mutual Defendants' Reply Memorandum in Support of Their Renewed Motion to Stay the Patent Infringement Claims Against Them Pending Ex Parte Reexamination of the Patents-In-Suit by the United States Patent and Trademark Office, *Progressive Casualty Insurance Company* versus *Allstate Insurance Company et al.*, U.S. District Court, Northern District of Ohio (Cleveland), filed Jul. 5, 2011, 55 pages.

Case No. 1:11-cv-00082-BYP, Mediation Conference Minute Sheet, *Progressive Casualty Insurance Company* versus *Allstate Insurance Company et al.*, U.S. District Court, Northern District of Ohio (Cleveland), dated Jul. 22, 2011, 2 pages.

Case No. 1:11-cv-00082-BYP, Memorandum of Opinion and Order Granting Liberty Mutual's Renewed Motion to Stay the Patent Infringement Claims Against Them Pending Ex Parte Reexamination of the Patents in Suit, *Progressive Casualty Insurance Company* versus *Allstate Insurance Company et al.*, U.S. District Court, Northern District of Ohio (Cleveland), dated Aug. 2, 2011, 5 pages.

Case No. 1:11-cv-00082-BYP, Notice and Order Reopening Case with Liberty Mutual, *Progressive Casualty Insurance Company* versus *Allstate Insurance Company et al.*, U.S. District Court, Northern District of Ohio (Cleveland), dated Jul. 24, 2012, 1 page.

Case No. 1:11-cv-00082-BYP, Progressive's Motion to Lift Moratorium on Formal Discovery, *Progressive Casualty Insurance Company* versus *Allstate Insurance Company et al.*, U.S. District Court, Northern District of Ohio (Cleveland), filed Oct. 19, 2012, 5 pages.

Case No. 1:11-cv-00082-BYP, Defendants' Motion to Stay Litigation Pending Covered Business Method Patent Review of the Patents-In-Suit by the United States Patent and Trademark office, *Progressive Casualty Insurance Company* versus *Allstate Insurance Company et al.*, U.S. District Court, Northern District of Ohio (Cleveland), filed Oct. 25, 2012, 292 pages.

Case No. 1:11-cv-00082-BYP, Liberty Mutual Defendants' Opposition to Plaintiff's Motion to Lift Moratorium on Formal Discovery, *Progressive Casualty Insurance Company* versus *Allstate Insurance Company et al.*, U.S. District Court, Northern District of Ohio (Cleveland), filed Oct. 26, 2012, 10 pages.

Case No. 1:11-cv-00082-BYP, Order Granting Progressive's Motion to Lift Moratorium, *Progressive Casualty Insurance Company* versus *Allstate Insurance Company et al.*, U.S. District Court, Northern District of Ohio (Cleveland), dated Nov. 1, 2012, 1 page.

Case No. 1:11-cv-00082-BYP, Plaintiff's Memorandum in Opposition to Defendants' Motion to Stay Litigation Pending Covered Business Method Patent Review of the Patens-In-Suit by the United States Patent and Trademark Office, *Progressive Casualty Insurance Company* versus *Allstate Insurance Company et al.*, U.S. District Court, Northern District of Ohio (Cleveland), filed Nov. 8, 2012, 9 pages.

Case No, 1:11-cv-00082-BYP, Defendant's Reply Memorandum in Support of Their Motion to Stay Litigation Pending Covered Business Method Patent Review of the Patents-In-Suit by the United States Patent and Trademark Office, *Progressive Casualty Insurance Company* versus *Allstate Insurance Company et al.*, U.S. District Court, Northern District of Ohio (Cleveland), filed Nov. 15, 2012, 2012, 13 pages.

Case No. 1:11-cv-00082-BYP, Order Denying Defendants' Motion to Stay, *Progressive Casualty Insurance Company* versus *Allstate Insurance Company et al.*, U.S. District Court, Northern District of Ohio (Cleveland), dated Dec. 18, 2012, 2 pages.

Case No. 1:11-cv-00082-BYP, Liberty Mutual's Notice Regarding Status of Covered Business Method Patent Petitions, *Progressive Casualty Insurance Company* versus *Allstate Insurance Company et al.*, U.S. District Court, Northern District of Ohio (Cleveland), filed Feb. 6, 2013, 90 pages.

Case No. 1:11-cv-00082-BYP, Liberty Mutual Defendants' Motion for Expedited Briefing, *Progressive Casualty Insurance Company* versus *Allstate Insurance Company et al.*, U.S. District Court, Northern District of Ohio (Cleveland), filed Feb. 8, 2013, 8 pages.

Case No. 1:11-cv-00082-BYP, Liberty Mutual Defendants' Motion to Require Plaintiff to Select Representative Claims for the Asserted Patents, *Progressive Casualty Insurance Company* versus *Allstate Insurance Company et al.*, U.S. District Court, Northern District of Ohio (Cleveland), filed Feb. 8, 2013, 38 pages.

Case No. 1:11-cv-00082-BYP, Liberty Mutual's Second Notice Regarding Status of Covered Business Method Patent Petitions, *Progressive Casualty Insurance Company* versus *Allstate Insurance Company et al.*, U.S. District Court, Northern District of Ohio (Cleveland), filed Feb. 13, 2013, 2013, 54 pages.

Case No. 1:11-cv-00082-BYP, Liberty Mutual Defendants' Renewed Motion to Stay Litigation Pending Covered Business Method Patent Review of the Patents-In-Suit by the United States Patent and Trademark Office, *Progressive Casualty Insurance Company* versus *Allstate Insurance Company et al.*, U.S. District Court, Northern District of Ohio (Cleveland), filed Mar. 4, 2013, 212 pages.

Case No. 1:11-cv-00082-BYP, Plaintiff's Opposition to the Liberty Mutual Defendant's Renewed Motion to Stay Litigation Pending Covered Business Method Review of the Patents- In-Suit by the United States Patent and Trademark Office, *Progressive Casualty Insurance Company* versus *Allstate Insurance Company et al.*, U.S. District Court, Northern District of Ohio (Cleveland), filed Mar. 18, 2013, 18 pages.

Case No. 1:11-cv-00082-BYP, Reply Memorandum in Support of Liberty Mutual Defendants' Renewed Motion to Stay Litigation Pending Covered Business Method Patent Review of the Patents-In-Suit by the United States Patent and Trademark Office, *Progressive Casualty Insurance Company* versus *Allstate Insurance Company et al.*, U.S. District Court, Northern District of Ohio (Cleveland), filed Mar. 25, 2013, 97 pages.

Case No. 1:11-cv-00082-BYP, Plaintiff's Opposition to the Liberty Mutual Defendants' Motion to Extend Certain Claim Construction Deadlines, *Progressive Casualty Insurance Company* versus *Allstate Insurance Company et al.*, U.S. District Court, Northern District of Ohio (Cleveland), filed Mar. 25, 2013, 4 pages.

Case No. 1:11-cv-00082-BYP, Order Staying Case, *Progressive Casualty Insurance Company* versus *Allstate Insurance Company et al.*, U.S. District Court, Northern District of Ohio (Cleveland), dated Apr. 17, 2013, 2013, 23 pages.

Case No. 1:11-cv-00082-BYP, Civil Docket, *Progressive Casualty Insurance Company* versus *Allstate Insurance Company et al.*, U.S. District Court, Northern District of Ohio (Cleveland), dated Apr. 17, 2013, 20 pages.

Case No. 1:12-cv-01068-BYP, Complaint for Patent Infringement, *Progressive Casualty Insurance Company* versus *State Farm Mutual Automobile Insurance Company*, U.S. District Court, Northern District of Ohio (Cleveland), filed Apr. 30, 2012, 141 pages.

Case No. 1:12-cv-01068-BYP, First Amended Complaint for Patent Infringement, *Progressive Casualty Insurance Company* versus *State Farm Mutual Automobile Insurance Company*, U.S. District Court, Northern District of Ohio (Cleveland), filed Aug. 16, 2012, 167 pages.

Case No. 1:12-cv-01068-BYP, Combined Supplemental Notice of Plaintiff Progressive Casualty Insurance Company, *Progressive Casualty Insurance Company* versus *State Farm Mutual Automobile Insurance Company*, U.S. District Court, Northern District of Ohio (Cleveland), filed Oct. 10, 2012, 5 pages.

Case No. 1:12-cv-01068-BYP, Joint Response to State Farm, Hartford, and Liberty Mutual Defendants to Plaintiff Progressive Casualty Insurance Company's Combined Supplemental Notice, *Progressive Casualty Insurance Company* versus *State Farm Mutual Automobile Insurance Company*, U.S. District Court, Northern District of Ohio (Cleveland), filed Oct. 11, 2012, 6 pages.

Case No. 1:12-cv-01068-BYP, Progressive's Motion to Lift Moratorium on Formal Discovery, *Progressive Casualty Insurance Company* versus *State Farm Mutual Automobile Insurance Company*, U.S. District Court, Northern District of Ohio (Cleveland), filed Oct. 19, 2012, 5 pages.

Case No. 1:12-cv-01068-BYP, Progressive Casualty Insurance Company's Answer to Defendant's Counterclaims, *Progressive Casualty Insurance Company* versus *State Farm Mutual Automobile Insurance Company*, U.S. District Court, Northern District of Ohio (Cleveland), filed Oct. 25, 2012, 6 pages.

Case No. 1:12-cv-01068-BYP, State Farm's Opposition to Plaintiff's Motion to Lift Moratorium on Formal Discovery, *Progressive Casualty Insurance Company* versus *State Farm Mutual Automobile Insurance Company*, U.S. District Court, Northern District of Ohio (Cleveland), filed Oct. 26, 2012, 6 pages.

Case No. 1:12-cv-01068-BYP, Order Granting Plaintiff's Motion to Lift Moratorium on Formal Discovery, *Progressive Casualty Insurance Company* versus *State Farm Mutual Automobile Insurance Company*, U.S. District Court, Northern District of Ohio (Cleveland), dated Nov. 1, 2012, 1 page.

Case No. 1:12-cv-01068-BYP, Motion to Admit Jonathan Redgrave Pro Hac Vice, *Progressive Casualty Insurance Company* versus *State Farm Mutual Automobile Insurance Company*, U.S. District Court, Northern District of Ohio (Cleveland), filed Mar. 8, 2013, 5 pages.

Case No. 1:12-cv-01068-BYP, State Farm's Motion to Stay and to Join the Motions of Liberty and Hartford Requesting a Stay, *Progressive Casualty Insurance Company* versus *State Farm Mutual Automobile Insurance Company*, U.S. District Court, Northern District of Ohio (Cleveland), filed Mar. 25, 2013, 245 pages.

Case No. 1:12-cv-01068-BYP, Order Granting Plaintiff's Motion for Oral Arguments, *Progressive Casualty Insurance Company* versus *State Farm Mutual Automobile Insurance Company*, U.S. District Court, Northern District of Ohio (Cleveland), filed Apr. 2, 2013, 2 pages.

Case No. 1:12-cv-01068-BYP, Plaintiff's Opposition to State Farm's Motion to Stay and Join the Motions of Liberty and Hartford Requesting Stay, *Progressive Casualty Insurance Company* versus *State Farm Mutual Automobile Insurance Company*, U.S. District Court, Northern District of Ohio (Cleveland), filed Apr. 8, 2013, 9 pages.

Case No. 1:12-cv-01068-BYP, State Farm's Reply in Support of Its Motion to Stay and to Join the Motions of Liberty and Hartford Requesting a Stay, *Progressive Casualty Insurance Company* versus *State Farm Mutual Automobile Insurance Company*, U.S. District Court, Northern District of Ohio (Cleveland), filed Apr. 10, 2013, 37 pages.

Case No. 1:12-cv-01068-BYP, Order Staying Case, *Progressive Casualty Insurance Company* versus *State Farm Mutual Automobile Insurance Company*, U.S. District Court, Northern District of Ohio (Cleveland), filed Apr. 17, 2013, 23 pages.

Case No. 1:12-cv-01068-BYP, Civil Docket, *Progressive Casualty Insurance Company* versus *State Farm Mutual Automobile Insurance Company*, U.S. District Court, Northern District of Ohio (Cleveland), dated Apr. 17, 2013, 6 pages.

"American Family Life Assurance Company expands services on their home page For their insurance subscribers," Insurance and Bank Daily News, Oct. 19, 1998, 1 page.

"American Home Assurance Company estimates a premium of auto insurance through the internet," Nihon Keizai Shimbun, Apr. 6, 1999, 1 page.

"American Home Assurance Company launches a contract service for traveler's insurance through the internet," Insurance and Bank Daily News, May 11, 1999, 1 page.

"Nippon Life Insurance Company launches electronic transaction service for their insurance subscribers from April," Nikkan Kogyo Shimbun, Ltd., Feb. 27, 1998, 1 page.

Institute of Life Insurance Management, "Use of the Internet in American Life Insurance," Life Insurance Management, vol. 1, No. 67, Apr. 6, 1999, pp. 105-121 (18 pages).

\* cited by examiner

FIG. 4

METHOD AND APPARATUS FOR INTERNET ON-LINE INSURANCE POLICY SERVICE

This application is a continuation of U.S. patent application Ser. No. 11/580,324, filed on Oct. 13, 2006, entitled "Method and Apparatus for Internet On-Line Insurance Policy Service," which issued as U.S. Pat. No. 7,877,269, which is a continuation of U.S. patent application Ser. No. 09/364,803, filed on Jul. 30, 1999, entitled "Method and Apparatus for Internet On-Line Insurance Policy Service," which issued as U.S. Pat. No. 7,124,088, the application and patents are herein incorporated by reference in their entirety.

BACKGROUND OF THE INVENTION

The present invention relates to data communication and processing systems, and particularly to a system for automated Internet on-line communication of proposed and actual changes to insurance policy parameters, assessing cost consequences of such proposed and actual changes, updating the insured's policy file and implementing desired policy changes, while avoiding insurer personnel involvement in the communication, updating and policy amendment process.

As used in this application, the term "Internet" means the global computer information system both as it exists currently and as it may change, evolve or develop over time and including any replacement or successor systems.

Vehicle insurance policies are now a legal requirement for driving rights in most jurisdictions and nearly all drivers own or are required to own some type of insurance. Conventional methods for acquiring such a policy usually entail relatively lengthy application processes between the buyer and a personal representative of the insurer such as either an insurance company salesperson or an independent agent for the company. The application process requires a communication of personal and historical data of the buyer and whatever vehicles are involved and their locations to allow the insurer to classify the prospective applicant in predetermined actuarial classes and for quoting a cost to the applicant. In addition, for existing customers of the insurance company, changes in policy parameters such as changes in residence, the vehicle locations, number of household drivers or acquisition of new or replacement of old vehicles covered by the policy require regular communication between the customer and the insurer or its agents. When such communication is required to be handled in writing, telephonically, or personally by the company representative or independent agent, the time consumption and associated costs for such personal handling can present cost and servicing problems which need to be minimized. Any way that the insurer can reduce personnel involvement in addressing policyholder' services is a way that can improve efficiency and reduce costs—costs that can be eliminated to result in lower rates to a consumer buying the insurance.

The present invention contemplates a new and improved insurance policy service and delivery system for communicating changes in policy parameters to an insurer via an Internet on-line automated system, thereby obviating representative or agent personal involvement in the interfacing and communicating of policy parameter changes, policy changes and associated charge adjustments between the customer and the insurer.

A BRIEF SUMMARY OF THE INVENTION

In accordance with the present invention, there is disclosed a method and apparatus for Internet on-line insurance policy service and delivery for real-time automated selective adjustment by a user of policy parameters, and for system computation and communication of resulting cost adjustments due to the policy parameter changes. The system comprises an information module for identifying a user to the system and for communicating currently existing policy parameters to the policyholder. A policy adjustment module selectively communicates parameter changes made by the user to the insurer's computer system and the computer then generates in real-time the resulting policy cost attributable to the parameter change. The cost adjustments can be communicated in the form of a quote, and if the computer is so instructed by the user, the policy change and related cost adjustment can be formally submitted and implemented.

In accordance with more limited aspects of the invention, the system further includes a claims information module for communicating information relative to claims processing, and a funds transfer module for on-line payment of accounts by a user.

In accordance with yet another aspect of the present invention, the parameter changes can comprise, for example, a change in garage location of the vehicle being insured or the personal residence of the holder of the policy, a change in the vehicles insured under the policy, the addition or deletion of one or more drivers under the policy or changes in coverages, deductible amounts or policy limits.

One benefit of the present invention is a more efficient handling of policyholder services to reduce inconvenience to the insurance customer and to reduce handling and involvement requirements of insurer personnel to attend to such services, thereby reducing overhead costs and ultimately providing an ability to insure policyholders on a more cost effective basis.

Another benefit of the subject invention is a reduction in the time cycle for communicating and implementing policy changes thereby assuring a more accurate coverage and minimizing time periods when the policy parameter changes are not properly incorporated into the policy.

Other benefits and advantages of the subject new policy service will become apparent to those skilled in the art upon a reading and understanding of the specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings which form a part hereof and wherein.

DETAILED DESCRIPTION OF THE INVENTION

The subject invention is related to a data processing system especially applicable to the insurance industry wherein a policyholder can, through Internet on-line accessing, view and update his or her particular policy information. After the policyholder/customer authenticates himself/herself, the system retrieves the verification, or other information requested by the policyholder from the system and displays it to the policyholder via the Internet. A user-friendly interface guides the customer through various activities including, without limitation, billing information, making a payment via a credit card or on-line check, policy information, state specific contract information, quoting an endorsement for vehicle replacement, address changes and claims information. The system displays the premium amount and variance and updates the customer file at the customer's request, without need for personal handling by an individual representative of the insurer or an independent agent. Most of the information presented to the customer is specific to that customer's policy only and is, of course, maintained confidential through a security code system and transferred/viewed via a secure server. Generic information generally describing the policy is also provided. The subject invention uniquely provides on-line viewing and updating of the customer's existing information and facilitates real-time updating of the policy parameters and the ability to implement policy changes on-line. Although discussed with primary reference to automobiles as the insured vehicle, the invention is applicable to any other type of insured item, i.e., boats, airplanes, personal or real property or any other thing that is subject to an insurance policy, as well as to other kinds of insurance that may be provided, such as life, disability, medical, dental, credit insurance and general liability insurance.

The subject system contains four critical areas or modules of content with the capability of expansion to additional product and policy services: policy information, policy updating, claims information and payment enablement via electronic funds transfer. The following outline details these modules and the subsequent detailed description of the invention will follow along this outline.

I. Policy Information Displayed for the Specific Policyholder Includes:
A. Billing and Account Information
   Account status
   Amount and receipt date of the last payment
   Amount and receipt date of the renewal payment (if applicable)
   Current amount due and due date
   Bill schedule
   Account payment history
B. Policy Details
   Mailing address
   Listed drivers, age, gender, driver type and proof of financial responsibility status
   Driving records for each driver listed on policy
   Year, make, model and vehicle identification number (VIN #) for each vehicle listed on the policy
   State policy contract valid for the specific policy
   Agent of record name, address and phone number
C. Coverages and Premiums
   Coverage limits listed by vehicle
   Premium displayed by coverage and vehicle
   Policy fees and taxes for total policy
II. Payment Functionality Includes:
   Account status
   Amount and receipt date of the last payment
   Amount and receipt date of the renewal payment (if applicable)
   Select a payment amount of either the current amount due, current amount and renewal payment, an amount entered that is greater than the minimum amount due or pay in full
   Select payment method of on-line check or credit card
III. Policy Updates include the following:
A. Vehicle Replacement
   Selection of which vehicle on the policy the insured wants to replace
   Selection of year, make, model and submodel the insured wants to quote
   Selection for physical damage coverages specific for the vehicle being quoted
   Listing of resultant premium change over the rest of the policy term
   Comparison of premium over the entire policy term
   Ability to update the policy for the vehicle replacement
   Revised billing schedule
   Quote summary of all quotes obtained by the customer
B. Vehicle Addition
   Selection for year, make, model and submodel the insured wants to add to the policy
   Garaging address, information about the car, and leasing/financing information collected
   Selection for physical damage coverages specific for the vehicle being quoted
   Listing of resultant premium change over the rest of the policy term
   Comparison of premium over the entire policy term
   Ability to update the policy for the vehicle replacement
   Revised billing schedule
   Quote summary of all quotes obtained by the customer
C. Address/Telephone Change
   Address displayed
   Requestor verified
   New address/telephone number collected
   Update garaging address by vehicle
   Listing of resultant premium change over the rest of the policy term
   Comparison of premium over the entire policy term
   Revised billing schedule
   Summary of changes
   Ability to update the address/telephone change
   If only the telephone number is changed, a declaration page prints and mailings are suppressed
D. Order Duplicate Insurance Forms
   Order ID cards or ID cards and duplicate declaration page sets
IV. Claims Information Includes:
   Claim number, incident date and status displayed for selection
   Driver and vehicle involved
   Location of loss, incident report date/time
   Inspection date/time
   Determination of total loss
   Claim features open
   Claim representative name and phone number
   Claims office location and street address
   Display of coverage at time of incident
   Payment history
   Information on subrogation, if applicable
   Total loss information
   Estimate information
   Rental and vehicle repair
   Communications directly to the claim representative's desk top Referring now to the drawings where the showings are for purposes of illustrating the preferred embodiments of the invention only and not for purposes of limiting same, the FIGURES show a method and apparatus for Internet on-line insurance policy servicing.

Figure 1:
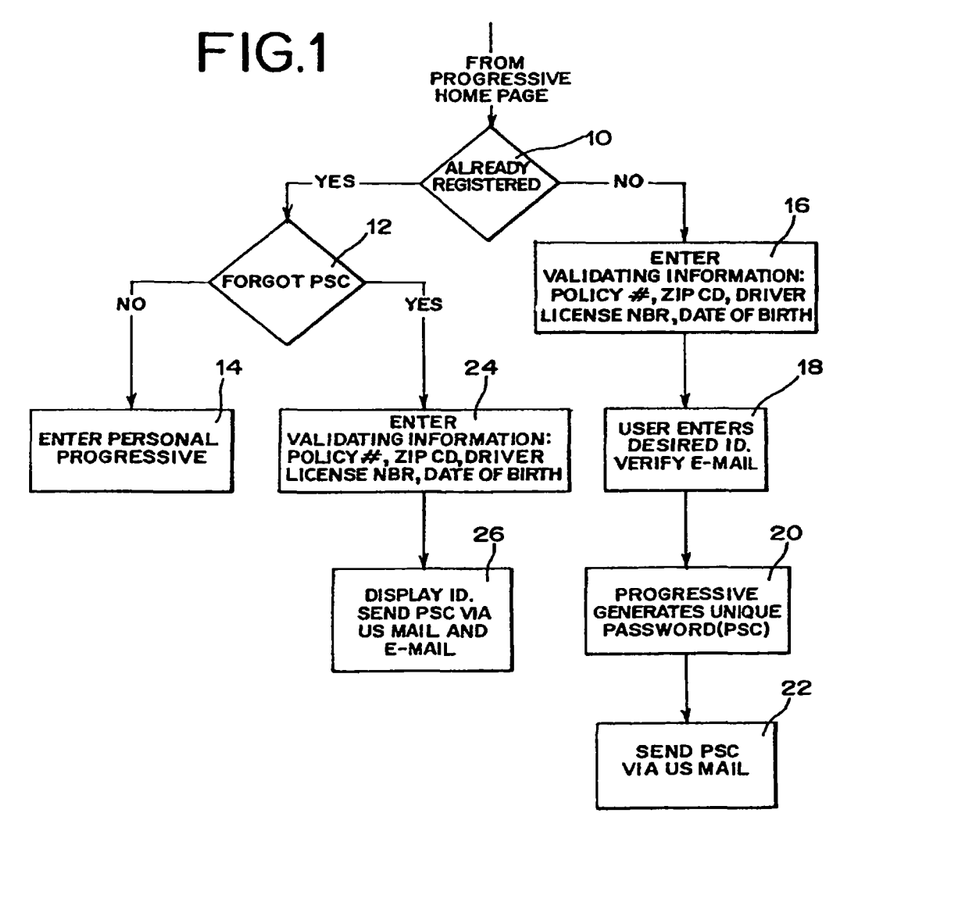
FIG. 1 is a flow diagram for accessing the subject system with a personal security code.

FIG. 1 is a flow diagram illustrating access to the subject system. A user can access the Internet with any conventional browser program and must first contact the Progressive home page (Progressive refers to Progressive Casualty Insurance Company of Mayfield Village, Ohio, the assignee of the subject application. "Personal Progressive" is the mark identifying a commercially implemented embodiment of the subject invention.) The process flow of FIG. 1 shows the customer can only access the system with a personal security code ("PSC") key. The system will query 10 if the customer has registered a personal security code and if the answer is "yes", the system will query 12 if the customer has forgotten the PSC and, if not, after the appropriate code is entered the customer can enter the system. Accompanying this attachment is an Appendix comprising photostats of the on-line displays a customer will encounter while moving through the system. Photostatic images are segregated in accordance with the outline headings above. Such displays can also be directly accessed through the Internet with an on-line personal computer system by typing the URL "http:\\personal.progressive.com". If the initial inquiry receives an answer that the customer does not have a PSC, then the customer must add validating information comprising the customer's policy number, the zip code, a driver's license number, a date of birth and an e-mail address 16. The user next enters 18 an ID code of some kind that is personal to the user and the system will verify the entered ID code via e-mail communication. The system will then generate a unique password (PSC) 20 and the password will be sent 22 to the customer at his home address via U.S. mail. The customer cannot enter the Personal Progressive system until after receipt of the PSC.

If the customer has a PSC, but it has been forgotten, then after the inquiry 12 the customer must enter 24 the validating information sent at step 16 and the system will display the preselected identity code and resend 26 the PSC via U.S. mail and e-mail.

The foregoing steps for inquiring and implementing the PSC are necessary for maintaining the personal confidentiality of any particular customer when accessing the system.

Figure 2:
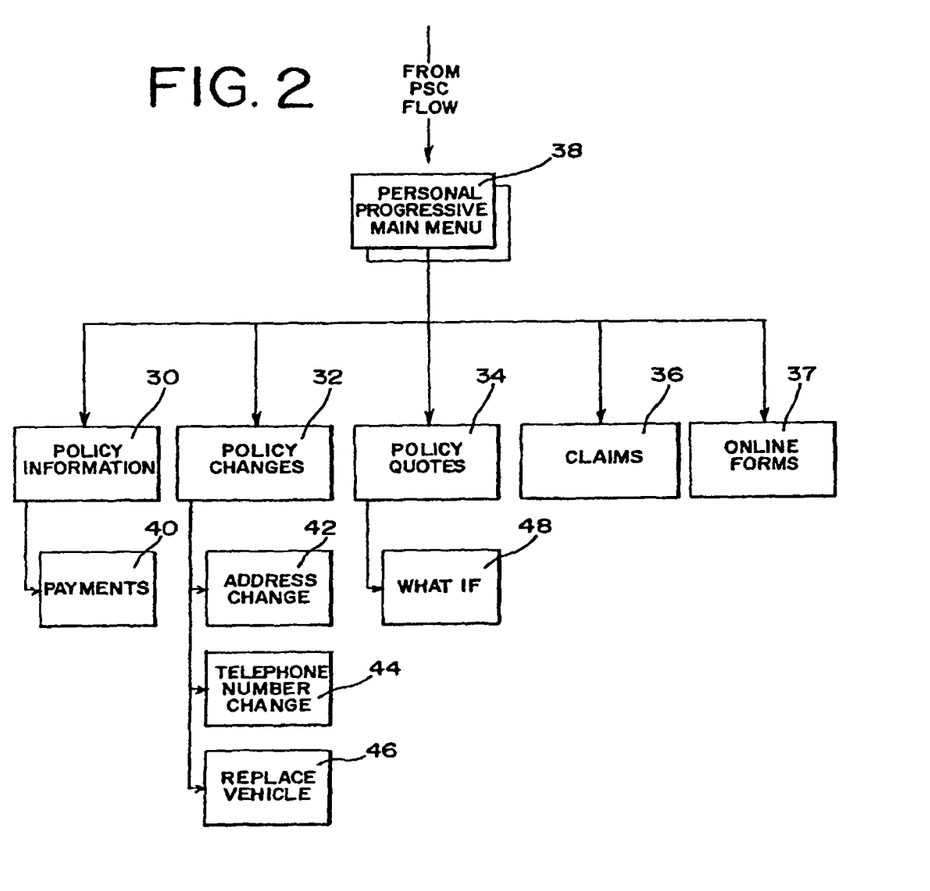
FIG. 2 is a block flow diagram identifying the principal processing modules of the subject invention.

As noted above, the subject system can be segregated into four critical areas of content. With reference to FIG. 2, these comprise policy information 30, policy changes 32, policy quotes 34 and claims information 36. A user can navigate to these particular modules from the Personal Progressive main menu 38 through web pages specifically designed to guide the customer to the desired information through clicks on alternative query marks or through the input of necessary information. Of course, the particular design of the web pages to facilitate the navigation or the customer's responses is a matter of subjective design and those shown in the Appendix, or at the URL address above, merely illustrate one particular convenient and successful page format set. Another module 37 provides the customer the ability to acquire on-line forms typically comprising duplicate insurance forms, such as ID cards and duplicate declaration page sets.

The policy information module 30 displays a variety of billing and account information, policy details and the particular coverage afforded by the cumulative premiums of the policy. The billing and account information comprises a display of the account status, i.e., whether it is active and if the account is paid to date including the amount and the receipt date of the last payment, the amount and receipt date of the renewal payment, if applicable, the current amount due on the due date, the bill schedule and the account payment history. The policy details that can be viewed and verified by the customer include, without limitation, the mailing address, the driver and vehicle information including a list of drivers, their age, gender, driver type and proof of financial responsibility status. The driving record for each driver listed on the policy can also be displayed. The vehicle information includes the year, make, model and VIN # for each vehicle listed on the policy. Other details include, without limitation, a display if there is a state policy contract valid for the customer's specific policy and the name, address and phone number of the agent of record for the customer. The coverage in premiums information comprises a very detailed report of the coverage limits listed by vehicle and the premiums displayed for various types of coverage per vehicle. For example, if three different vehicles were involved, each vehicle would receive a display of what the bodily injury liability premium is for the specified term of the policy as well as various other liability premiums for items such as property damage, uninsured motorist, medical expenses and collisions, etc., i.e., all the conventional premium information that is relevant to any particular policy.

Payments module 40 also comprises a display of some relevant account information such as account status, the amount and receipt date of the last payment, and the amount and receipt date of the renewal payment (if applicable). In addition, though, the customer may select a payment amount via the current amount due, the current amount for the renewal term, pay in full or an amount that must be greater than the minimum amount due. The payment method can be selected as either an on-line check or a credit card.

The policy changes module 32 is primarily comprised of modules for changing the customer's address 42, telephone number 44 or of replacing or adding 46 a vehicle to the policy coverage.

Figure 3:
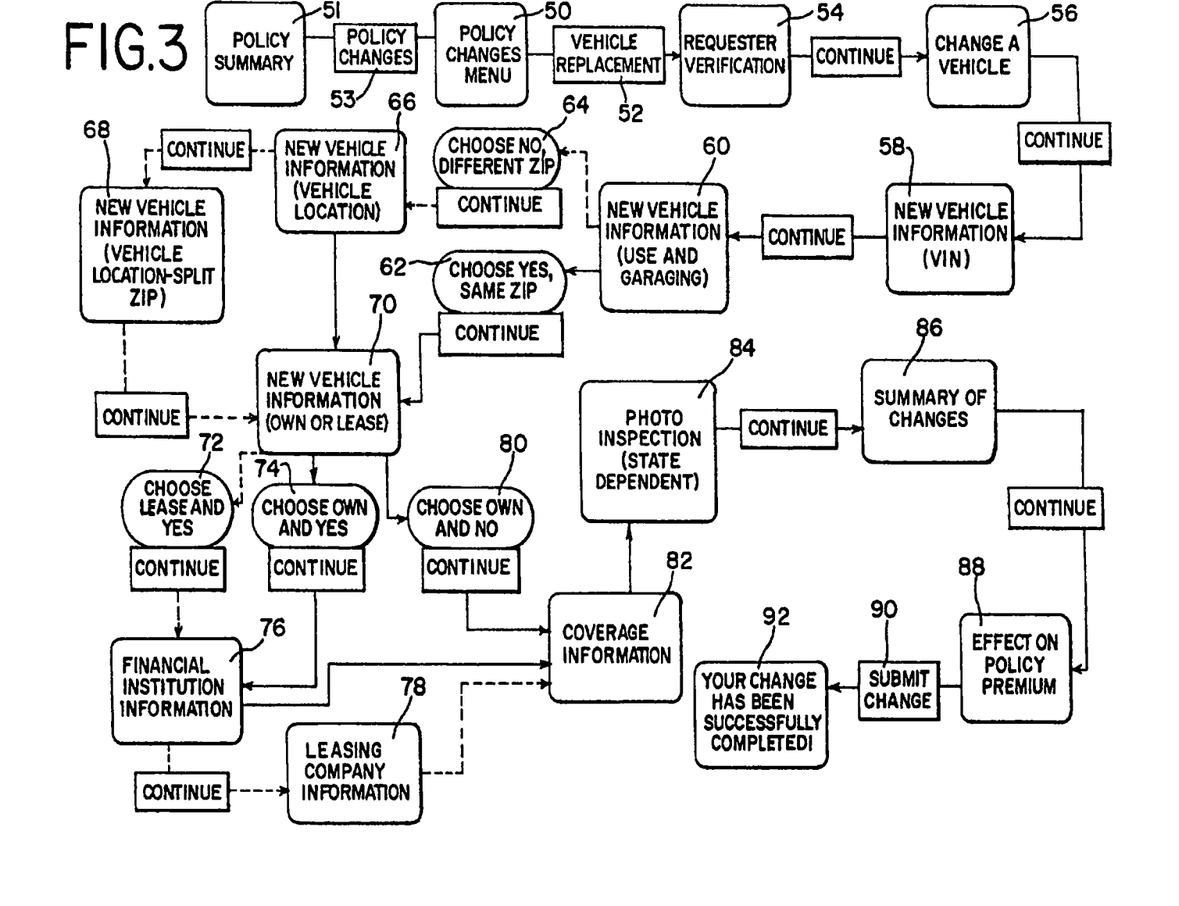
FIG. 3 is a flow diagram illustrating steps for updating a policy change comprising a vehicle replacement.

With reference to FIG. 3, the following steps illustrate the navigation through various web pages that a customer will make to effect a vehicle replacement on the policy. The "continue" boxes can be clicked by the user to move to the next page. Initially, the customer will encounter a policy summary page 51 from which the customer will select the policy changes module 53. The policy changes menu 50 displays an option of vehicle replacement 52 in response to which the customer receives a request for verification page 54. After verification, the customer identifies 56 which vehicle from the policy is to be replaced. The identity of the new vehicle 58 is entered by the customer including the year, make, model, submodel information and VIN #. Additional information 60 relates to the use and garaging, i.e., if the car is a commuter car and whether it will be garaged at the same address as the resident address of the owner 62 or whether it will be garaged at a different address 64. If it is going to be garaged at a different address, then the system will inquire as to the different garaging location 66 or in some states, if there is more than one municipality in a zip code, the customer must indicate the correct municipality in which the vehicle is garaged, i.e., a split zip 68. In either case the system will next inquire if the vehicle is owned or leased 70. If leased 72, or owned 74, and financing payments are necessary, then the system will inquire as to the financial institution receiving the lease or financing payments 76 and the identity of the leasing company 78. After completion of this financial information, or if the vehicle is owned outright 80 by the customer, then the system will inquire as to what particular coverage information is desired for the vehicle 82. The coverage information relates to physical damage coverage such as comprehensive and collision and further coverages such as towing/labor, rental or loan lease are optionally available. As a particular assist to the customer, the system optionally provides general coverage definitions for various types of coverages offered under the subject insurance policy. After the coverage information 82 has been submitted to the system, an inquiry will be made if the vehicle must have a photo inspection 84 pursuant to state/company regulations and information is displayed accordingly. The summary of changes 86 identifies to the customer the current vehicle and its various coverages and the new replacement vehicle and its various coverages along with the date of effectiveness of the supplied policy change and the effect 88 the policy change will have on the premium, i.e., how the change would affect the premium for the remainder of the current policy term and how the change would affect the premium for the entire policy term. At this stage, the customer has only received an estimate and must verify that the change actually should be submitted 90. If submitted, then the summary of changes are again displayed along with the acknowledgment that the changes have been successfully completed 92.

Each page has a "cancel" button which takes the customer to a page indicating that "your changes have been discarded", prior to final submission.

Figure 4:
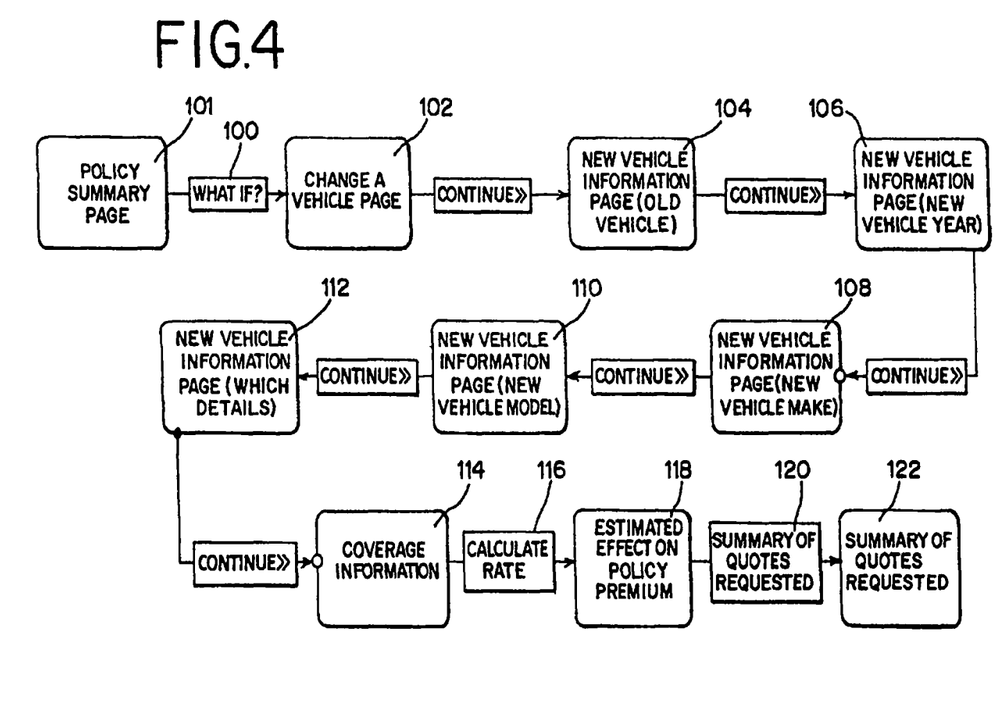
FIG. 4 is a flow diagram of the steps for acquiring an estimate of a rate change resulting from a possible vehicle replacement.

With reference to FIG. 4, often times a customer will merely want to receive a quote before purchasing a vehicle to determine what the insurance cost effect would be if the vehicle had actually been purchased. The policy quotes module 34 (FIG. 2) comprises a "what if" process, currently known as "Policy Quotes", 48 the steps of which are detailed in FIG. 4. Accordingly, after the policy summary 101 is displayed, the customer will click on the "what if" button 100 to indicate that receiving a quote for changing a vehicle is desired. Customers will also be able to reach this functionality via the main menu 38 (FIG. 2). The change of vehicle page 102 continues into a new vehicle information page 104 where the customer selects which of the present vehicles on the policy are expected to be replaced. Alternatively, the customer can specify that the new vehicle is an addition, by indicating that none of the present policy vehicles are intended to be replaced. Important information relative to the new vehicle, such as the vehicle year 106, make 108, and model 110 are solicited prompting a new vehicle information page including system memory of more detailed information indicated by the customer. Such more detailed information relates to body series, body style, engine size, cylinders, wheel drive, and the customer selects the combination of the detailed information 112 which most accurately fits the intended new vehicle. The pertinent coverage information is again solicited 114 from the customer. The current liability coverage is usually indicated to remain the same. The appropriate rate for the new vehicle is calculated at 116. The estimated effect on the policy premium is displayed 118, i.e., either an increase or decrease on the policy premium for the remaining or next period. The customer can request a summary 120 of quotes requested and such summary will be displayed 122.

Figure 5:
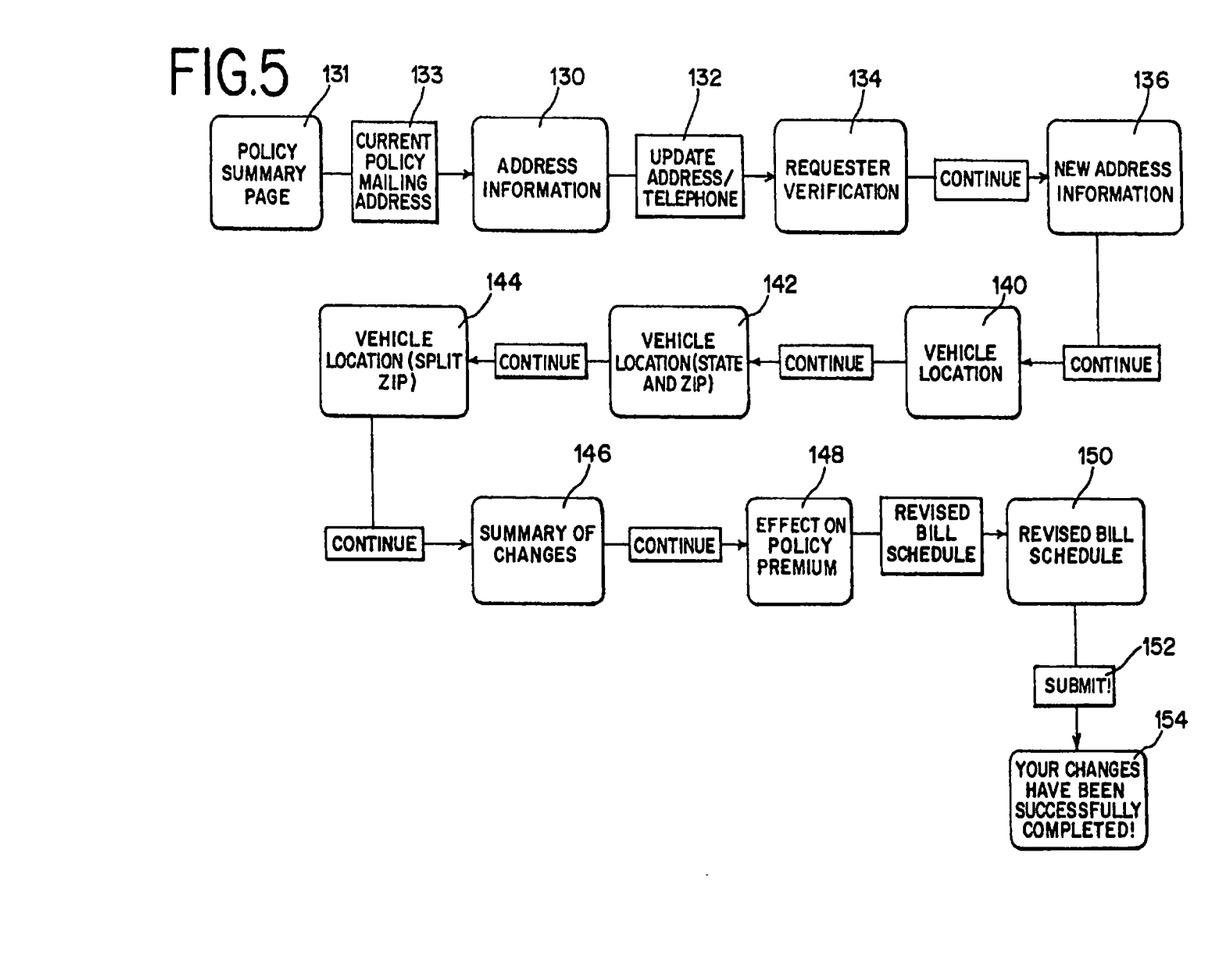
FIG. 5 is a flow diagram of the steps of implementing a policy change due to an address or telephone change.

FIG. 5 illustrates the steps for navigating the address change module 42 or telephone number change module 44.

FIG. 5 starts out similar to FIGS. 3 and 4 in that from the policy summary page 131 the customer must indicate that he is interested in the policy change module 133 and in particular dealing with address and telephone information 130. Customers will also be able to reach this functionality via the main menu 38 (FIG. 2). The customer indicates that he wants to update the address or telephone information 132. The user then verifies 134 his identity, identifies the new address information 136 and further identifies 138 if the vehicle will be located at the same location 140 or if it will be garaged at a different location 142 and in some cases selects the appropriate municipality in a zip code 144. A summary of changes is displayed to the user 146 and the effect such address changes have on the policy premium 148. The customer then inquires as to the effect that the change would have on the bill schedule and a display 150 identified by installment date and due date of the difference between the current policy rates and the new rates as a result of the address change. The customer can then submit the changes 152 and the system will acknowledge that the changes have been successfully completed to the policy 154.

All the foregoing changes in the policy parameters, i.e., addition of vehicles, replacement of vehicles, changes in vehicle locations, or changes in customer locations, are communicated and implemented without any assistance, supervision or involvement of a personal representative of the insurance company. The customer navigates the modules to effect the changes to the policy.

Figure 6:
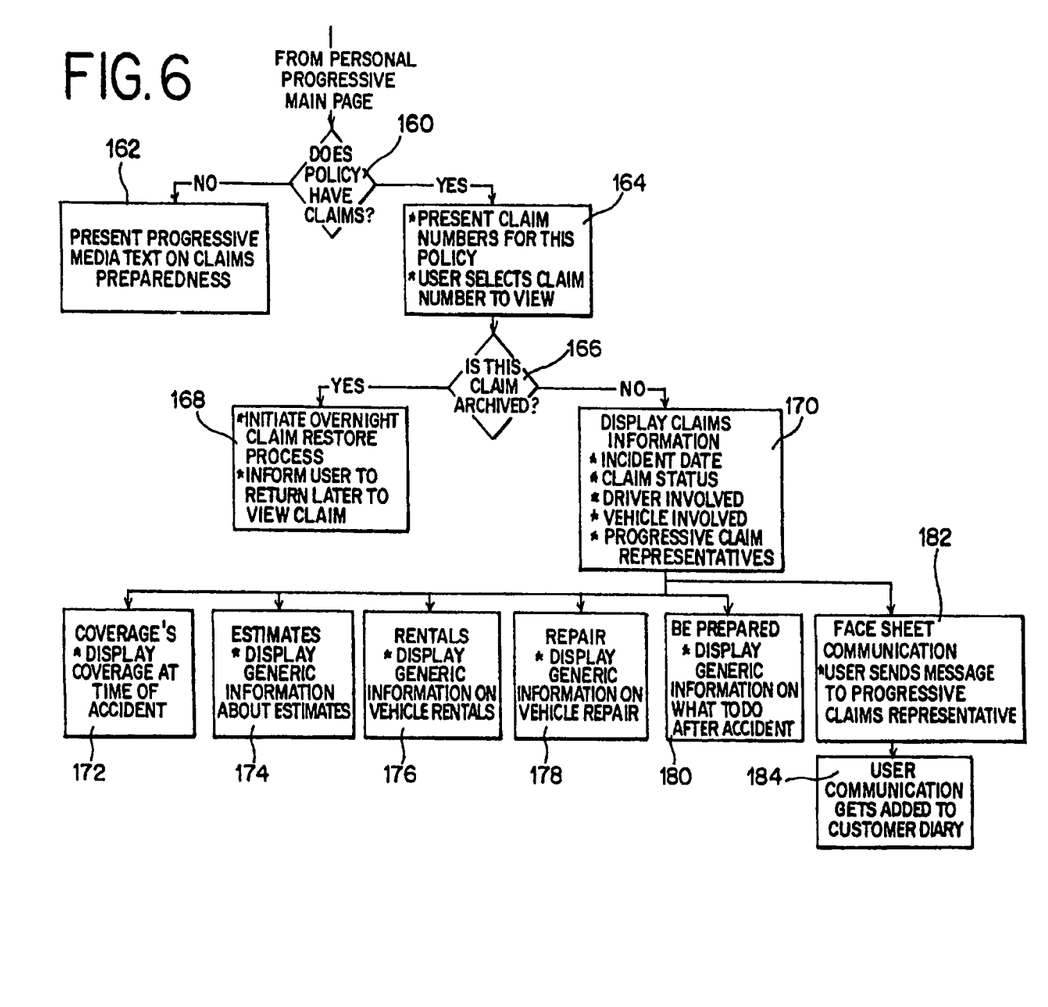
FIG. 6 is a flow diagram of communicating claims information from the system.

With particular reference to FIG. 6, it is another advantage of the system that claims information can be communicated to a customer when a claim has been made against the policy. For example, if the insured vehicle was involved in an accident, the customer has the ability with the present invention to monitor on-line the handling of the claim. In particular, if the customer selects the claims module 36 (FIG. 2) from the Personal Progressive main menu, the customer could inquire 160 if there are currently any claims on the policy. If not, the system can present an informative text on claims preparedness 162. If there has been a claim, an identifying claim number for the claim is displayed relating to incident date and whether the claim status is active or inactive. The customer can select a particular claim number for viewing 164. When a claim number is selected, the system will inquire if the claim is archived 166 to a separate storage location and if so, the relevant information must be restored to the system, usually in an overnight process, and the customer is informed to return 168 at a later time to view the desired claim information. If not archived, then the display presents detailed claim information relating to the driver and vehicle involved, the location of loss, the incident report date/time, the inspection date/time, determination of losses, whether the other claim features are yet open and the identity of the claim representative comprising the representative's name and telephone number. Additional information can be presented relating to the claims office location and street address. Other pertinent information relating to the claim relates to coverages 172 comprising a display of the coverage provided by the policy at the time of the accident or other loss, estimate information 174 for repair or reimbursements, and rental information 176 relating to vehicle rentals for temporarily providing transportation after being involved in the accident or other loss. Other information relates to repairs to the vehicle involved 178 and generic information about what to do after an accident or other loss 180. This system displays a face sheet communication allowing the customer to send a message to the claims representative of whatever information the customer feels important 182 and the customer message is added automatically 184 to the diary pertaining to this particular claim. An important advantage of the claims module 36 is its ability to allow a customer to communicate directly to the representative's desk top diary after having full access to relevant information relating to the claim.

The invention has been described with reference to preferred embodiments. Obviously, modifications and alterations will occur to others upon a reading and understanding of the specification. It is our intention to include all such modifications and alterations insofar as they come within the scope of the appended claims or the equivalents thereof.

Having thus described our invention, we claim:

1. A network based insurance management system comprising:
   a networked computer system that provides an insurance policy interface having functionality for insurance policyholders to receive insurance policy information, receive insurance quotes, update an existing insurance policy, access claim information, and enable payment for a property-casualty insurance policy and a liability insurance policy and access coverage features of an existing insurance policy through a publicly accessible network;
   an information module embodied on the computer readable medium that identifies the insurance policyholder and verifies an insurance parameter of that insurance policyholder in real-time in response to data received from the insurance policyholder through the publicly accessible network and the insurance policy interface; and
   an insurance policy adjustment module embodied on the computer readable medium that adjusts an insurance policyholder's selected coverage feature within the existing insurance policy in real-time in response to second data received from the insurance policyholder through the publicly accessible network and the insurance policy interface independent of an insurance agent; and
   where the second data is associated with the insurance policyholder's selected coverage feature and the insurance policy adjustment module generates an insurance document customized to the insurance policyholder and sends the customized insurance document to the insurance policyholder in response to the second data received from the insurance policyholder through the publicly accessible network.

2. The network based insurance management system of claim 1 where the insurance policy interface has functionality for insurance policyholders to receive insurance quotes, update an existing insurance policy, access claim information, and enable payment for a health-care insurance policy.

3. An on-line insurance policy service system, comprising:
   a computer system that enables an insurance policyholder to access insurance data of an existing insurance policy remotely through a publicly accessible network;
   an information module configured to run on the computer system and verify an insurance policy parameter of the insurance policyholder in real-time in response to data received from the insurance policyholder through a publicly accessible network; and
   an insurance policy adjustment module configured to run on the computer system and adjust and implement a selected insurance policy parameter within the insurance policyholder's existing insurance policy in real-time in response to second data received from the insurance policyholder through the publicly accessible network and a software application that allows the insurance policyholder to access the selected insurance policy parameter;
   where the second data is associated with an insurance coverage feature.

4. The system of claim 3 where the insurance policy adjustment module is configured to adjust insurance policy data stored on an insurer's computer remote from the insurance policyholder's computer in real-time in response to receipt of the second data received from the insurance policyholder through the publicly accessible network.

5. The system of claim 3 where the insurance policy adjustment module is configured to generate in real-time an insurance policy cost adjustment attributable to the adjustment of the insurance policyholder's insurance policy parameter.

6. The system of claim 5 where the insurance policy adjustment module is configured to communicate the insurance policy cost adjustment in real-time to the insurance policyholder over the publicly accessible network.

7. The system of claim 3 where the insurance policy adjustment module is configured to generate in real-time an insurance policy coverage adjustment attributable to the adjustment of the insurance policyholder's insurance policy parameter.

8. The system of claim 3 where the insurance policy adjustment module is configured to verify in real-time the adjustment of the insurance policyholder's insurance policy parameter back through the publicly accessible network to the insurance policyholder.

9. The system of claim 3 where the adjustment of the insurance policy parameter is an adjustment to an insurance deductible associated with the existing insurance policy, and where the insurance policy adjustment module is configured to generate and communicate to the insurance policyholder over the publicly accessible network in real-time an insurance policy cost adjustment attributable to the adjustment of the insurance deductible.

10. The system of claim 3 where the adjustment of the insurance policy parameter is an adjustment to a policy limit associated with the existing insurance policy, and where the insurance policy adjustment module is configured to generate and communicate to the insurance policyholder over the publicly accessible network in real-time an insurance policy cost adjustment attributable to the adjustment of the policy limit.

11. The system of claim 3 where the adjustment of the insurance policy parameter is an adjustment to address information associated with the insurance policyholder, and where the insurance policy adjustment module is configured to generate and communicate to the insurance policyholder over the publicly accessible network in real-time an insurance policy cost adjustment attributable to the adjustment of the address information.

12. The system of claim 3 where the adjustment of the insurance policy parameter is a replacement of a vehicle associated with the insurance policy, and where the insurance policy adjustment module is configured to generate and communicate to the insurance policyholder over the publicly accessible network in real-time an insurance policy cost adjustment attributable to the replacement of the vehicle.

13. The system of claim 3 where the insurance policy adjustment module is configured to communicate with the insurance policyholder through the publicly accessible network and adjust the insurance policyholder's insurance policy parameter without involvement of an insurance agent or personal representative of an insurer.

14. The system of claim 3 further comprising a claims information module and a payment enablement module associated with the computer system.

15. The system of claim 3 further comprising a claims information module and a policy quotes module associated with the computer system.

16. The system of claim 3 further comprising a claims information module, a payment enablement module, and a policy quotes module associated with the computer system.

17. An on-line insurance policy service system, comprising:

a computer system that enables an insurance policyholder to access insurance data of an existing insurance policy remotely through a publicly accessible network capable of relaying information through an Internet protocol;

an information module stored on the computer system for identifying the insurance policyholder and for verifying present policy parameters of the existing insurance policy to the insurance policyholder through the publicly accessible network; and a policy adjustment module stored on the computer system for implementing a policy parameter change associated with the existing insurance policy in response to data received from the insurance policyholder through a software application that accesses the publicly accessible network;

where the insurance policy adjustment module is configured to communicate with the insurance policyholder through the publicly accessible network and adjust the insurance policyholder's insurance policy parameter associated with an insurance coverage without involvement of an insurance agent or personal representative of an insurer.

18. The system of claim 17 where the policy adjustment module is configured to adjust insurance policy data stored on an insurer's computer remote from the insurance policyholder's computer in real-time in response to receipt of the data received from the insurance policyholder through the publicly accessible network.

19. The system of claim 17 where the policy adjustment module is configured to communicate the parameter change to the insurance policyholder through the publicly accessible network, and generate in real-time a cost adjustment attributable to the parameter change.

20. The system of claim 19 where the policy adjustment module is configured to communicate the cost adjustment in real-time to the insurance policyholder over the publicly accessible network.

21. The system of claim 17 where the parameter change is an adjustment to an insurance deductible, a policy limit, address information, or a vehicle associated with the existing insurance policy, and where the insurance policy adjustment module is configured to generate and communicate to the insurance policyholder over the publicly accessible network in real-time an insurance policy cost adjustment attributable to the adjustment to the insurance deductible, the policy limit, the address information, or the vehicle associated with the existing insurance policy.

22. The system of claim 17 further comprising a claims information module, a payment enablement module, and a policy quotes module associated with the computer system.

23. An on-line insurance policy service system, comprising:

a computer system that enables an insurance policyholder to access insurance data of an existing insurance policy remotely through a publicly accessible network capable of relaying information through an Internet protocol;

an information module stored on the computer system for identifying the insurance policyholder and for verifying present policy parameters of the existing insurance policy to the insurance policyholder through the publicly accessible network;

a policy adjustment module stored on the computer system for implementing a policy parameter change associated with the existing insurance policy in response to data received from the insurance policyholder through the publicly accessible network; and a claims module stored on the computer system for verifying coverage under the existing insurance policy, for tracking vehicle repair, and for tracking status of an insurance claim associated with the insurance policyholder in response to second data received from the insurance policyholder without the involvement of an insurance agent or a personal representative of an insurer;

where the insurance policy adjustment module is configured to communicate with the insurance policyholder through the publicly accessible network and a software application that accesses the publicly accessible network, and adjust the insurance policyholder's insurance policy parameter without involvement of the insurance agent or personal representative of the insurer.

24. An on-line computer system, comprising:

a site generating module configured to generate an insurance policy site on a publicly accessible computer network that allows a claimant to directly input information for an insurance claim under an insurance policy issued by an insurance company for sustained losses; and a claims module configured to process the inputted information and identify the claimant, confirm insurance coverages, and summarize the insurance claim based on the processing of the information;

the claims module including a module aggregating services related to a loss recovery that is configured to automatically provide aggregated services to the claimant to rehabilitate the sustained loss in accordance with the information processed by the claims module;

wherein the site generating module and the claims module enable the claimant to communicate, without action by personnel of the insurance company, directly with a third party provider independent of the insurance company, of services related to loss recovery.

25. The on-line computer system of claim 24, wherein the site is operative as an on-line claim reporting hub to report details of personal insurance claims.

26. The on-line computer system according to claim 25 wherein the input information for an insurance claim is selected from the group consisting of automobile claims and homeowners claims.

27. The on-line computer system according to claim 25 wherein the publicly accessible computer network comprises a global computer network that accepts inputs directly from insurance policyholders independent of an insurance agent, an insurance broker or the insurance company.

28. The on-line computer system according to claim 24 wherein the on-line insurance policy system provides continuous network claim service handling.

29. The on-line computer system according to claim 24 further comprising a privacy preserving module for preserving site users' privacy while online at the insurance policy site.

30. The on-line computer system according to claim 24 wherein the on-line insurance policy system permits vendors of services to make known or call attention to and offer products that individuals or businesses require to rehabilitate for the sustained loss.

* * * * *